(12) United States Patent
Clark et al.

(10) Patent No.: US 6,625,726 B1
(45) Date of Patent: Sep. 23, 2003

(54) METHOD AND APPARATUS FOR FAULT HANDLING IN COMPUTER SYSTEMS

(75) Inventors: Michael T. Clark, Austin, TX (US); Scott A. White, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 663 days.

(21) Appl. No.: 09/587,114

(22) Filed: Jun. 2, 2000

(51) Int. Cl.[7] .............................. G06F 9/44; G06F 9/30; G06F 9/40
(52) U.S. Cl. ..................... 712/245; 712/243; 712/231; 712/202; 712/23; 712/244
(58) Field of Search ................................ 712/217, 231, 712/218, 23, 245, 243, 244, 202

(56) References Cited

U.S. PATENT DOCUMENTS

| | | | | |
|---|---|---|---|---|
| 5,826,094 A | * | 10/1998 | Colwel et al. ............... | 712/23 |
| 5,878,244 A | | 3/1999 | Witt et al. .................... | 712/23 |
| 6,079,014 A | * | 6/2000 | Papworth et al. ........... | 712/233 |

* cited by examiner

*Primary Examiner*—Daniel H. Pan
(74) *Attorney, Agent, or Firm*—Lawrence J. Merkel; Meyertons, Hood, Kivlin, Kowert & Goetzel, P.C.

(57) ABSTRACT

A method and apparatus for fault handling in computer systems. In one embodiment, a first register is used to store an address which points to the top of a stack. The address stored in the first register may be updated during the execution of an instruction. A second register may be used to store an address previously first register. The contents of the second register may be kept unchanged until the retirement of the instruction that is currently executing. If a fault occurs during execution of the instruction, a microcode fault handler may perform routines that may clear the fault or those conditions which led to the fault. The microcode fault handler may also copy the contents of the second register back into the first register. Execution of the instruction may be restarted from the operation just prior to when the fault occurred. The program from which the instruction originated may then continue to run. The first and second registers may be general purpose registers in some embodiments, while special purpose registers may be used in other embodiments.

16 Claims, 5 Drawing Sheets

METHOD AND APPARATUS FOR FAULT HANDLING IN COMPUTER SYSTEMS

BACKGROUND OF THE INVENTION

1. Field of the Invention

This invention is related to processors, and more particularly, to a method and apparatus for fault handling during the execution of computer instructions.

2. Description of the Relevant Art

Superscalar microprocessors achieve high performance by executing multiple instructions concurrently and by choosing the shortest possible clock cycle consistent with the design. As used herein, the term "clock cycle" refers to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Many superscalar microprocessor manufacturers design their microprocessors in accordance with the x86 microprocessor architecture. The x86 microprocessor architecture is widely accepted in the computer industry, and therefore a large body of software exists which is designed to this architecture. Microprocessors designed in accordance with the x86 architecture advantageously retain compatibility with this body of software. As will be appreciated by those skilled in the art, the x86 architecture (as well as many other architectures) includes a "stack" area in memory. The stack is useful for passing information between a program and a subroutine called by that program, among other things. In the x86 architecture, a variety of architecturally defined ("architected") registers are included for storing operands of instructions. For example, the ESP (extended stack pointer) register points to the address in memory which currently forms the top of the stack. A stack structure is a Last-In, First-Out (LIFO) structure in which values are placed on the stack in a certain order and are removed from the stack in the reverse order. Therefore, the top of the stack contains the last item placed on the stack. The action of placing a value on the stack is known as a "push", and requesting that a push be performed is a "push command". The action of removing a value from the stack is referred to as a "pop", and requesting that a pop be performed is a "pop command". When a push command is performed, the ESP register is decremented by the size (in bytes) of the value specified by the push command. The value is then stored at the address pointed to by the decremented ESP register value. When a pop command is performed, a number of bytes specified by the pop command are copied from the top of the stack to a destination specified by the pop command, and then the ESP register is incremented by the number of bytes.

Often times, an instruction (typically a microcode instruction) may include several operations, some of which may cause further updates to the ESP register. In addition to updating the ESP register, a microcode routine corresponding to one of such instructions may also include operations which allow the tracking of previous ESP register states should the routine need to be restarted in the event of a fault. Typically, an additional tracking operation may be added to a microcode routine for each update of the ESP register within the routine. The tracking of previous states of the ESP register may also involve writing such states to temporary storage locations, and reading from a temporary storage location if a previous ESP register value must be retrieved. Such operations may be performed each time the microcode routine containing them is executed. The adding of such extra operations may result in a performance penalty when executing the microcode routine without experiencing a fault, and may increase its complexity as well. This performance penalty may become severe for a complex microcode routine that involves several updates of the ESP register.

If a fault or an exception occurs, a microcode fault handler or other type of exception handler may execute fault handling routines. Such fault handling routines may attempt to remove those conditions from which the fault originated. Such fault handling routines may also attempt to restore the ESP register to its state just prior to the occurrence of the fault. The ability to restore the ESP register to its pre-fault state may be dependent upon the correct functioning of tracking operations in complex microcode routines. If such routines contain bugs or otherwise fail to properly track the updates of the ESP register, the currently running program may experience erroneous operation, and in some cases, may be prematurely terminated.

SUMMARY OF THE INVENTION

The problems outlined above are in large part solved by a method and apparatus for fault handling in computer systems. In one embodiment, a first register is used to store an address which points to the top of a stack. The address stored in the first register may be updated during the execution of an instruction. A second register may be used to store the address previously stored in the first register. The contents of the second register may be kept unchanged until the retirement of the instruction that is currently executing. If a fault occurs during execution of the instruction, a microcode fault handler may perform routines that may clear the fault or those conditions which led to the fault. The microcode fault handler may also copy the contents of the second register back into the first register. Execution of the instruction may be restarted from the operation just prior to when the fault occurred. The program from which the instruction originated may then continue to run. The first and second registers may be general-purpose registers in some embodiments, while special purpose registers may be used in other embodiments.

In one embodiment, the method and apparatus may be implemented in an x86 processor. The ESP register of an x86 processor may store an address which points to the top of a stack (often referred to as a stack pointer). The contents of a speculative ESP, which may be a register distinct from the ESP register, may be updated during the execution of an instruction (e.g. at the retirement of various instructions in a microcode routine corresponding to the instruction). The speculative ESP may correspond to an architected ESP register. A second register, known as a recovery ESP, may also store the address, and may not be updated until the currently executing instruction is retired (e.g. at the exit of the microcode routine).

A reorder buffer may be used to monitor the registers and make updates as necessary. If, during the execution of an instruction, the reorder buffer detects an update to the ESP register, it may also update the recovery ESP following the retirement of that instruction. The reorder buffer may also store previous updates of the ESP register. At least one address corresponding to an operation in a previous instruction may be maintained in the recovery ESP. If a fault occurs during the execution of the instruction, the reorder buffer may then copy the address from the beginning instruction boundary back to the speculative ESP, responsive to instructions from the microcode fault handler. If the microcode fault handler successfully clears the fault condition(s), execution of the instruction may resume from the beginning instruction boundary.

In general, the method and apparatus may be applied to any computer architecture which employs the use of a stack and a register which may be used to store a stack pointer. Furthermore, the method and apparatus may be applied to any register.

Thus, in various embodiments, the method and apparatus for fault handling may allow a computer system to recover from a fault. A second register may be used to store and maintain address updates from a first register, which may be used as a stack pointer. If the attempted execution of a given instruction results in a fault, a microcode fault handler may clear those conditions which caused the fault. An address stored in the second register may be copied back into the first register, returning the first register to its original state at the beginning of the instruction which faulted. Execution of the instruction may then be restarted. In many cases, the occurrence and handling of the fault may be transparent to a user of the computer system. The method and apparatus may prevent the crash of application or system software.

Furthermore, by using a hardware mechanism to store previous states of the first register, operations for tracking the various states of the first register may be eliminated from complex microcode routines. This may result in the elimination of the performance penalty associated with such tracking operations. In addition, a programmer of microcode instructions may be relieved of the task of programming extra operations to keep track of previous states of the ESP register, instead relying on hardware to accomplish this task. As such, complex microcode routines may operate more efficiently, and may be significantly easier to program.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION OF THE INVENTION

Figure 1:
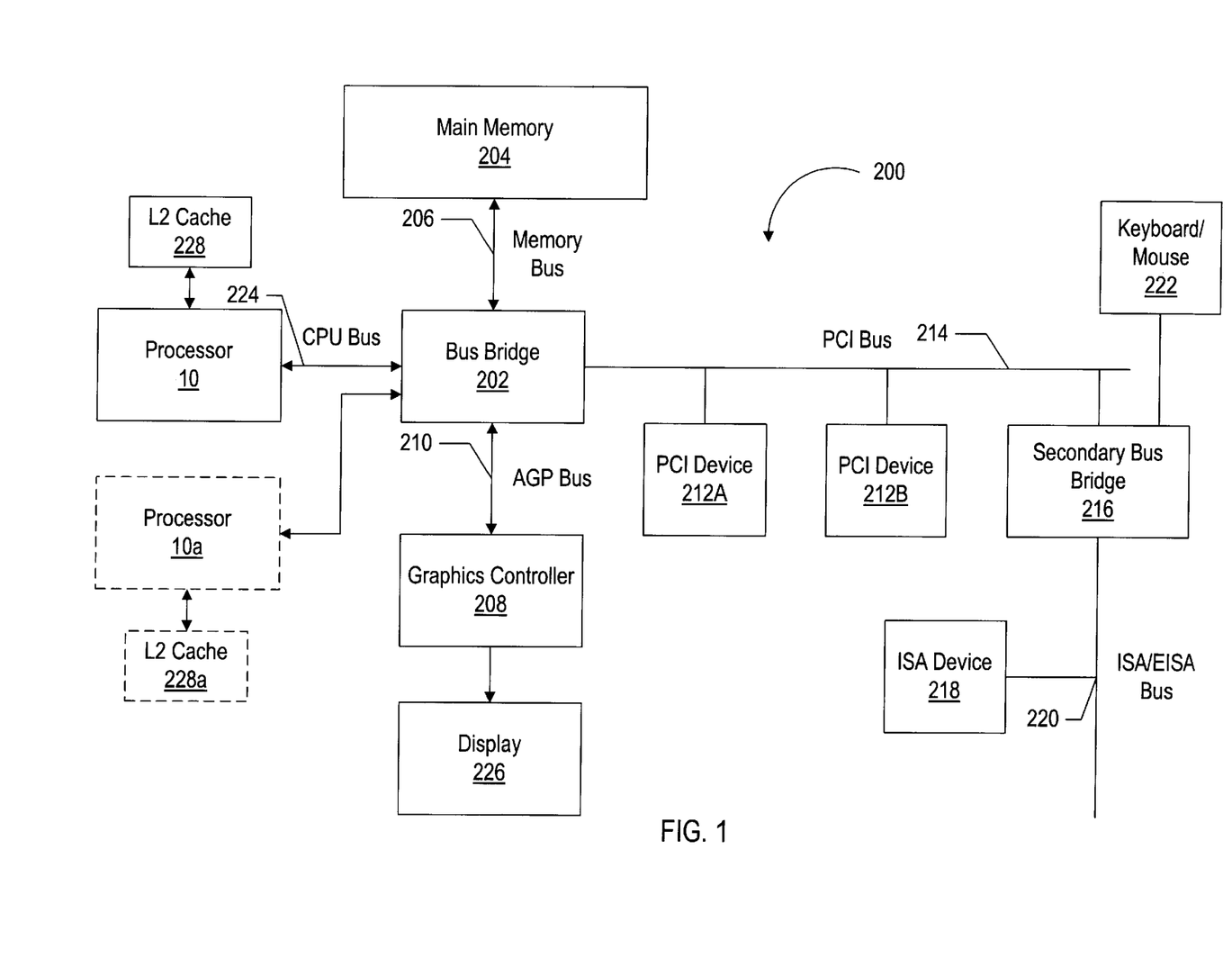
FIG. 1 is a block diagram of one embodiment of a computer system in which the method and apparatus for fault handling would be implemented.

Turning now to FIG. 1, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 1) or may share CPU bus 224 with processor 10. Furthermore, processor 10a may be coupled to an optional L2 cache 228a similar to L2 cache 228.

Figure 2:
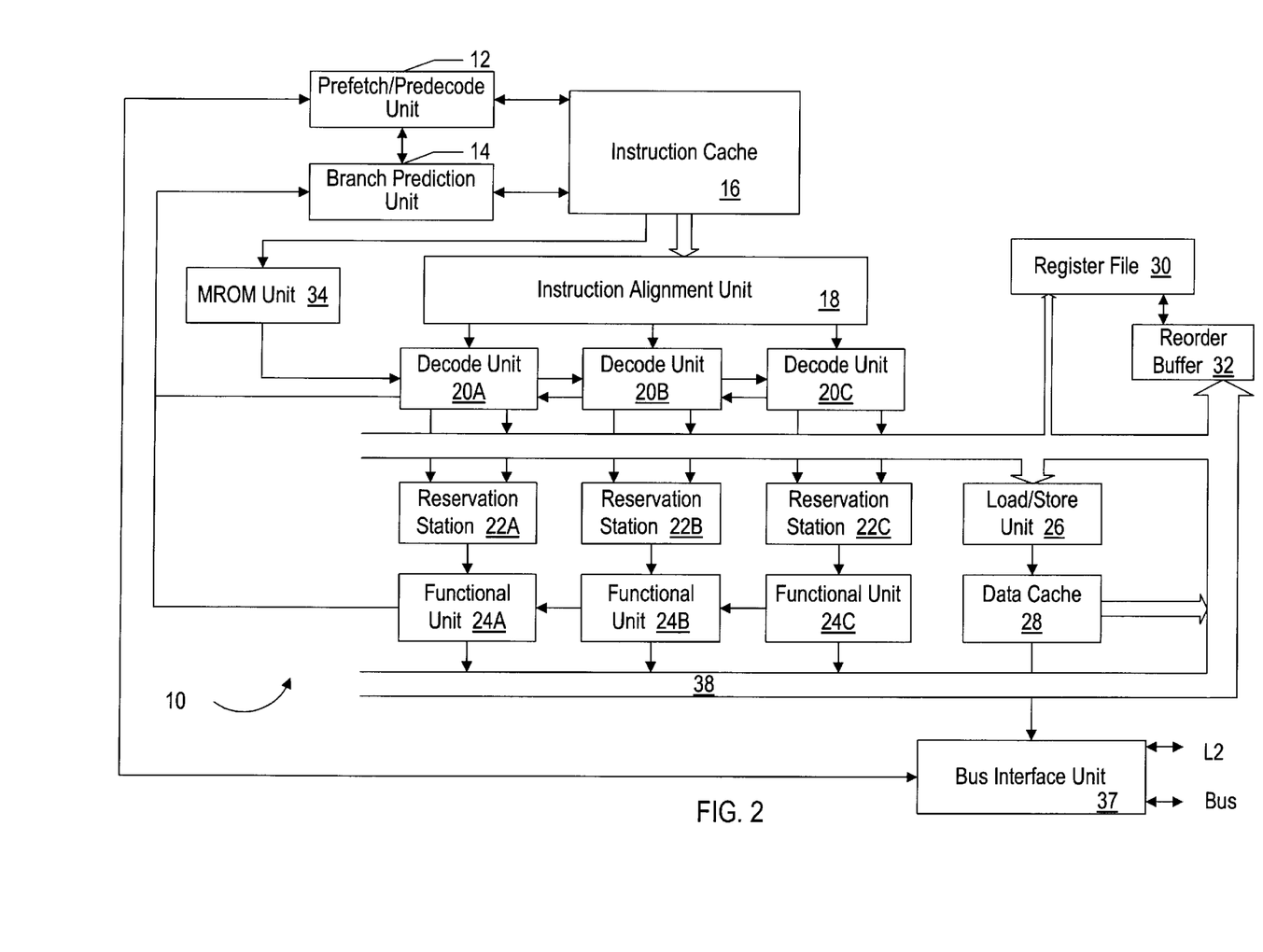
FIG. 2 is a block diagram of one embodiment of a processor in which the method and apparatus for fault handling would be implemented.

Moving now to FIG. 2, a block diagram of one embodiment of a processor 10 is shown. Other embodiments are possible and contemplated. As shown in FIG. 2, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, a microcode read-only memory (MROM) unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high-speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, or microcode routines, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

Start bits 10000

End bits 00001

Functional bits 11000

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high-speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

Figure 3:
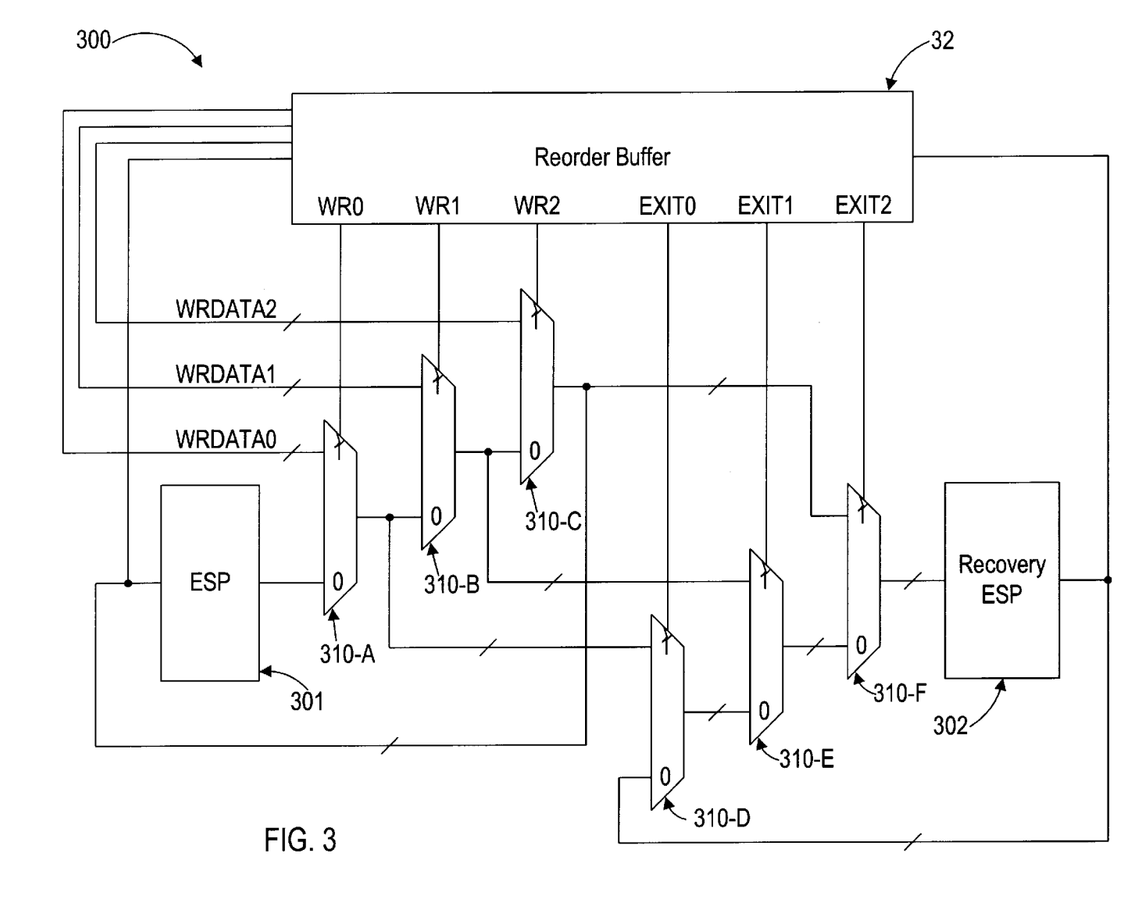
FIG. 3 is a block diagram of one embodiment of the fault handling apparatus.

FIG. 3 is a block diagram of one embodiment of fault handling apparatus 300. Fault handling apparatus 300 includes reorder buffer 32, speculative ESP 301, recovery ESP 302, and a plurality of multiplexers 310A–F. Reorder buffer 32 may be similar or equivalent to reorder buffer 32 of FIG. 2. Speculative ESP 301 is a stack pointer register, and may store an address which points to the top of a stack in memory. The address stored in speculative ESP 301 may be used to access data from the stack for the currently executing instruction. As used herein, the term 'instruction' may refer to those instructions which may be directly decoded by a decode unit (e.g. fast path instructions as described above) or microcode-level instructions (e.g. MROM instructions as described above). MROM instructions (i.e. microcode routines) may be represented by multiple entries in reorder buffer 32, as each microcode routine may include several instructions.

Recovery ESP 302 may store an address previously stored in speculative ESP 301. The address stored in speculative ESP 301 may be updated during the execution of an instruction (for example, at the retirement of instructions within a microcode routine). Conversely, the address stored in recovery ESP 302 may not be updated during execution of the same instruction, but instead may be updated responsive to the retirement of the currently executing instruction. If it becomes necessary to restart the instruction, reorder buffer 32 may access recovery ESP 302 and write the stored address back into speculative ESP 301.

Reorder buffer 32 may write one of four addresses to recovery ESP 302. In the embodiment shown, an array of selection logic is formed by multiplexers 310A–F. Through these multiplexers, reorder buffer 32 may access the current value stored in speculative ESP 301 and write the value to recovery ESP 302. Reorder buffer 32 may also write one of three values of corresponding to retiring instructions from reorder buffer 32 into recovery ESP 302. These values may be conveyed via the bussed signal paths labeled WRDATA0, WRDATA1, and WRDATA2, through the selection logic of multiplexers 310A–F to recovery ESP 302. Selection signals (WR0, WR1, EXIT0, etc) may be used to select the source of the address to be written to recovery ESP 302.

An explanation of the signals used to toggle multiplexers 310 A–F is in order here. In the embodiment shown, reorder buffer 32 may use a "line-oriented" structure, wherein the results of up to three instructions may be dealt with at any single retirement instance (i.e. a "line" of instructions). The instructions in a line may appear in an order in which they were originally intended for execution. In the embodiment shown, the instruction corresponding to the signals WR0 and EXIT0 may be the oldest of the instructions within a line, while those instructions corresponding to signals WR2 and EXIT2 may be the most recent. Signals WR0–WR2 may be asserted following the retirement of an instruction which updates the contents of the ESP register. For example, if the second instruction in a line is retired, and that instruction results in an update to the ESP register, signal WR1 may be asserted. Assuming signal WR2 remains deasserted, the address conveyed on the bussed signal path WRDATA1 may be passed through multiplexers 310-B and 310-C to speculative ESP 301, thereby causing an update of that register.

Signals EXIT0–EXIT2 may be asserted if the corresponding reorder buffer entry is a boundary of an x86 instruction. For directly decoded instructions (i.e. "fast path" instructions), one entry is allocated to the instruction and is the boundary for microcode level instructions. Multiple entries (one per instruction within the corresponding microcode routine) are allocated and the last instruction in the routine is the boundary, in one embodiment, and may be an exit operation. Thus, the signals EXIT0, EXIT1, or EXIT2 may be asserted at the retirement of an exit operation. Although an exit operation may be a single operation, it may be used in complex, multi-operation microcode instructions. An exit operation may be used to signal to the processor that a microcode instruction has successfully completed execution. Thus, if a particular instruction of a line currently in reorder buffer 32 is an exit operation, it may cause one of the EXIT signals to be asserted. For example, if the last instruction in a line is an exit operation, it may cause the EXIT2 signal to assert. When EXIT is asserted in the embodiment shown, multiplexer 310-F will allow data present at the output of multiplexer 310-C to be written into recovery ESP 302. The data present at the output of multiplexer 310-C may be the contents of speculative ESP 301 (when signals WR0–WR2 are all deasserted), or data conveyed over one of bussed signal paths WRDATA0, WRDATA1, or WRDATA2.

Figure 4:
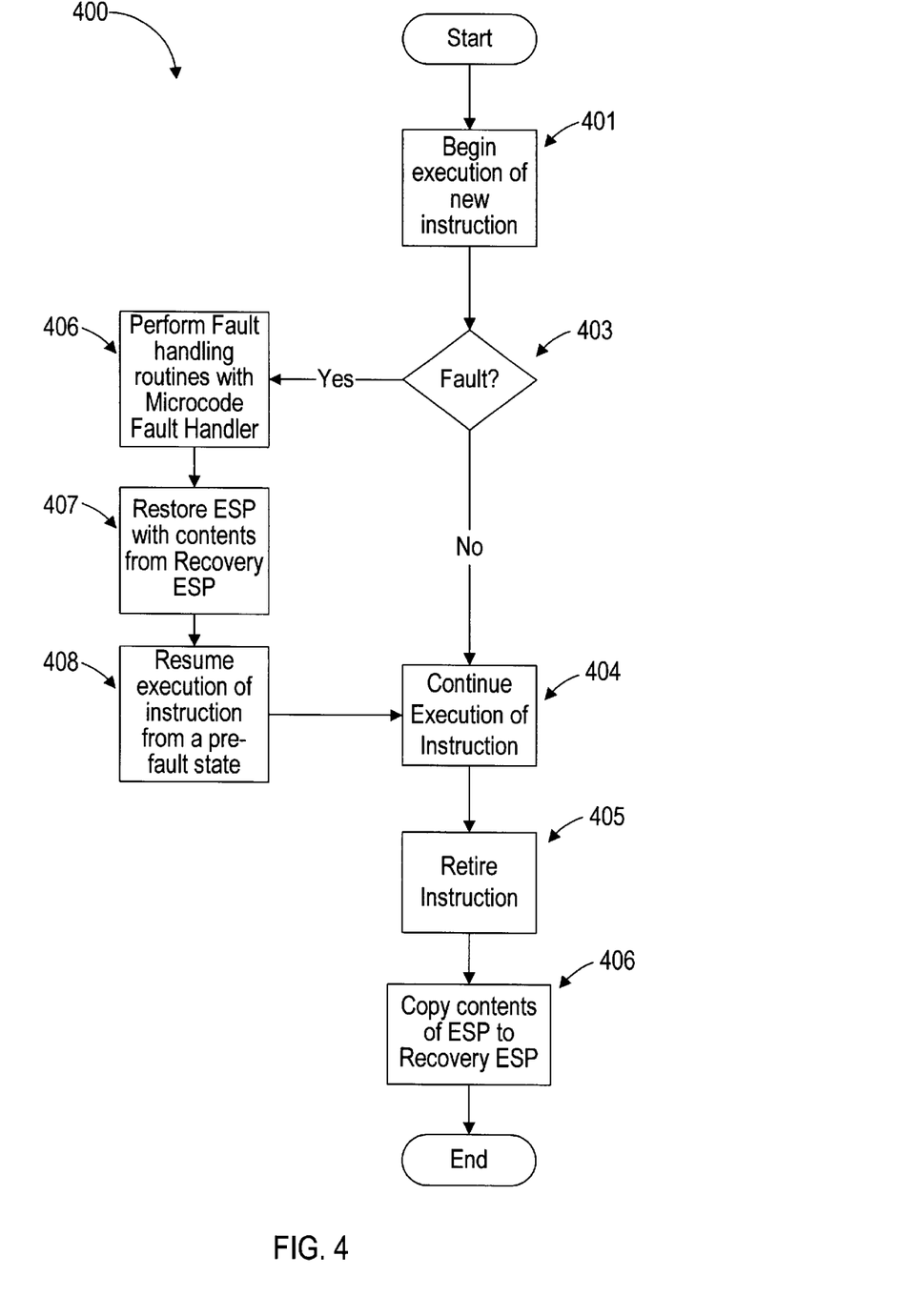
FIG. 4, is a flow diagram of the method of operation for one embodiment of the fault handling apparatus.

Moving now to FIG. 4, a flow diagram of the method of operation for one embodiment of fault handling apparatus 300 is shown. The embodiment shown here generally applies to the execution of a single instruction, including events which may occur if the instruction generates a fault. It should be noted however, particularly in superscalar processors, that several instructions may be executing at any given instant.

The method begins with the execution of a new instruction (Step 401). The instruction may be a microcode level instruction and thus Step 401 may comprise fetching a corresponding microcode routine from MROM unit 34 of FIG. 2.

If the currently executing instruction does not fault (Step 403) during the execution of an instruction, it may continue execution (Step 404) until it is retired (405). The instruction executed in Step 404 may include updating the ESP register. A microcode level instruction may be retired when the end instruction boundary is reached (e.g. exit instruction, or exit operation). Following retirement of the instruction, the contents of the recovery ESP may be updated (Step 406). The computer system may then begin the execution of a new instruction, and the method as shown here may be repeated.

If a fault does occur in Step 403, fault handling routines may be performed by a microcode fault handler or other type of fault handling mechanism. MROM Unit 34 of FIG. 2 may store microcode instructions which may be used in fault handling routines, while some other types of fault handling mechanisms may be implemented using software. The fault handling routines may be able to clear or alter those conditions from which the fault originated. For example, the attempted execution of an instruction may generate one type of fault known as a page fault. A page fault may occur when a processor attempts to access information from main memory. If the requested information is not currently stored in main memory, a page fault occurs. In response to the page fault, a software fault handling mechanism may execute fault handling routines that cause the requested information to be loaded into main memory from a hard disk or other storage device. With the requested information in memory, the instruction may be executed a second time with no page fault occurring.

Often times, particularly with more complex instructions (such as MROM instructions), the execution of an instruction may cause multiple updates to the ESP register. In order to restart the instruction from the beginning, the ESP register must be restored to its value at the beginning of the instruction. In step 407, the original value of the ESP register may be restored by copying it from the recovery ESP. With the ESP register returned to its original state (i.e. the beginning of the instruction), execution of the faulting instruction may be restarted (Step 408). Instruction execution may then continue until the instruction is retired (Steps 404 and 405).

Figure 5:
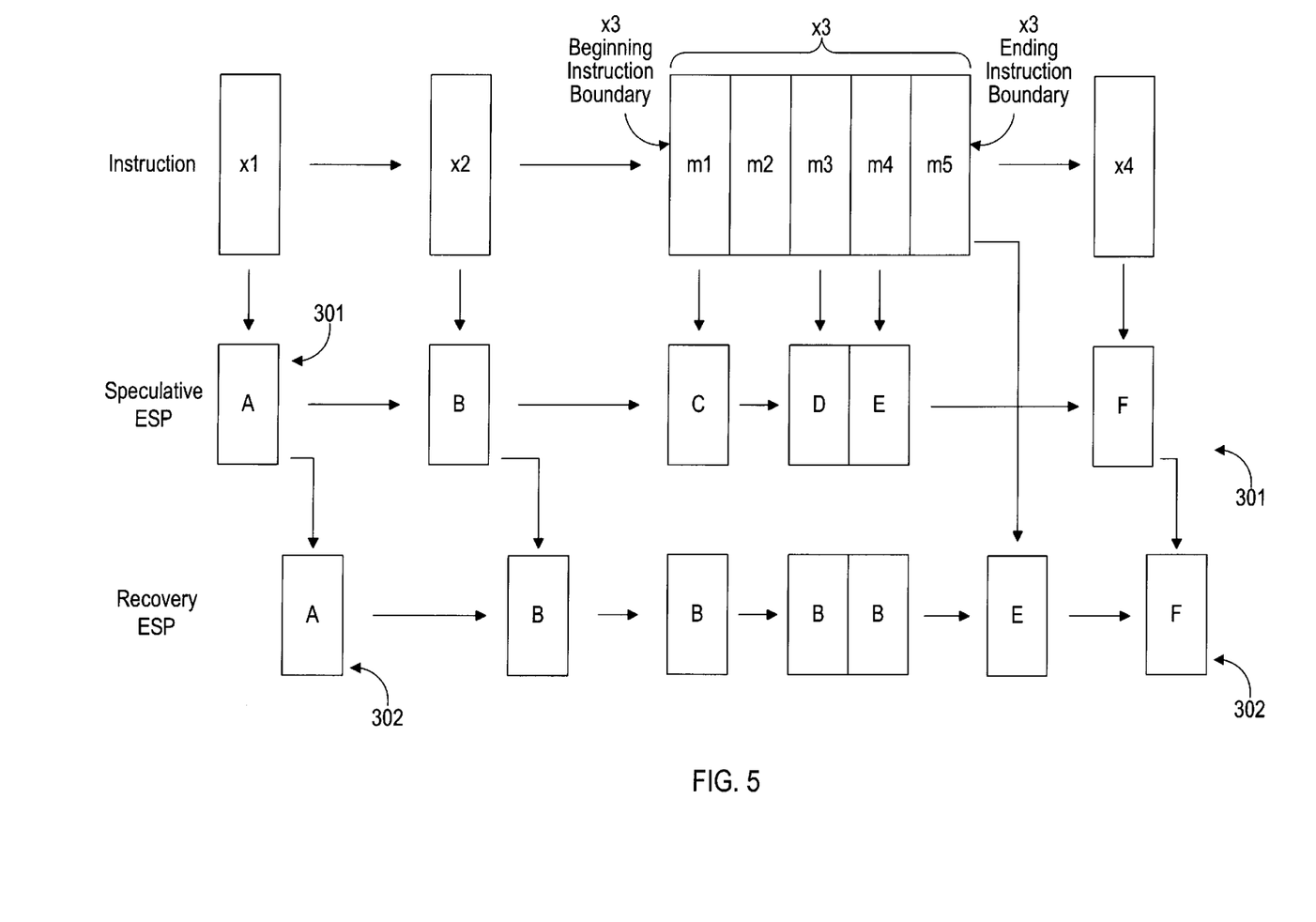
FIG. 5 is a block diagram illustrating the updating of the ESP and recovery ESP during the execution of instructions for one embodiment of the fault handling apparatus.

Moving now to FIG. 5, a block diagram illustrating the updating of the ESP and recovery ESP during the execution of instructions for one embodiment of fault handling apparatus 300 is shown. In the drawing, four separate instructions (x1 through x4) are to be executed. The execution of each instruction may cause an update to speculative ESP 301. As shown in the diagram, speculative ESP 301 may be updated to address A for the execution of instruction x1, which is a fast path instruction. In response to the update of speculative ESP 301, recovery ESP may also be updated to store address A responsive to the retirement of instruction x1. In general, for fast path instructions, speculative ESP 301 and recovery ESP 302 may be both updated at the retirement of the instruction. Alternate embodiments, wherein recovery ESP 302 is updated only following the exit operation of a microcode instruction are possible and contemplated.

When instruction x2 begins execution, speculative ESP 301 may then be updated to store address B. Similarly, recovery ESP 302 may also be updated to store address B following the retirement of instruction x2.

Instruction x3 is an MROM instruction (i.e. microcode routine) and includes five microcode operations, m1 through m5. The beginning instruction boundary of instruction x3 is the beginning of operation m1, while the ending instruction boundary is the end of operation m5. For a multiple-operation instruction such as instruction x3, it is possible that the stack pointer register may be updated multiple times during its execution. In the example shown, speculative ESP 301 is updated on three separate occasions during the execution of instruction m3. Operation m1 of instruction x3 may cause address C to be written into speculative ESP. Address B may remain in recovery ESP 302, since operation m1 does not occur at the ending instruction boundary of instruction x3. Operations m3 and m4 may also cause similar updates to speculative ESP 301, updating it to address D and then address E, while recovery ESP may continue to store address B, since neither operation m3 or m4 is on the ending instruction boundary of instruction x3.

In some cases, if a restart of an instruction is necessary, it may be desirable to restart the instruction at the beginning instruction boundary. Because of this, it may be desirable to ensure that the stack pointer address corresponding to the beginning instruction boundary is available at least until the instruction is retired. In this example, address B corresponds to the beginning instruction boundary of instruction x3. Address B may be stored in either recovery ESP 302 until after instruction x3 has been retired.

Following the retirement of instruction x3, instruction x4 may be executed. Recovery ESP 302 may be updated with address E responsive to the retirement of instruction x3. Speculative ESP 301 may be updated with address F during the execution of instruction x4. If a fault were to occur during the execution of instruction x4, address E may then be copied back from recovery ESP 302 into speculative ESP 301, allowing instruction x4 to be restarted with the same stack pointer address held in speculative ESP 301 at its beginning instruction boundary. Following the successful execution and retirement of instruction x4, recovery ESP may be updated with address F While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A processor comprising:
   a first register corresponding to an architected register;
   a second register coupled to said first register and corresponding to said architected register; and
   a reorder buffer coupled to said first register and said second register, wherein said reorder buffer is configured to retire one or more instructions comprising a microcode routine, and wherein said reorder buffer is configured to update said first register responsive to an update of said architected register by any of said one or more instructions, and wherein said reorder buffer is configured to update said second register responsive to retirement of one of said one or more instructions forming an end of said microcode routine.

2. The processor as recited in claim 1, wherein said first register corresponds to a stack pointer register, said stack pointer register configured to store an address which points to a stack.

3. The processor as recited in claim 2, wherein said address stored in said stack pointer register points to the top of said stack.

4. The processor as recited in claim 1 further comprising a microcode read-only memory (MROM), said MROM operatively coupled to said first register, said second register, and said reorder buffer, wherein said MROM is configured to store said microcode routine and further configured to store microcode fault-handling routines configured to, responsive to detection of a fault, cause said reorder buffer to copy a value stored in said second register to said first register.

5. The processor as recited in claim 4, wherein said microcode fault-handling routines are configured to restart an instruction following said copying said value stored in said second register into said first register.

6. The processor as recited in claim 1, wherein said second register is configured to store a stack pointer address corresponding to am instruction boundary.

7. The processor as recited in claim 1, wherein said reorder buffer is configured to store register updates for said one or more instructions, and furthermore, wherein said reorder buffer is configured to store pending updates to said first register.

8. The processor as recited in claim 7, wherein said reorder buffer is configured to copy one of said pending updates to said first register.

9. The processor as recited in claim 8, wherein said reorder buffer is coupled to selection logic, wherein said selection logic is configured to select one of said pending updates to be copied to said first register.

10. The processor as recited in claim 9, wherein said selection logic is configured to select one of said previous updates to be copied to said second register.

11. The processor as recited in claim 1, wherein each of said instructions are part of an instruction set of said processor.

12. A method of operating a processor, the method comprising:

updating a first register responsive to the retirement of a first instruction within a microcode routine, said first register corresponding to an architected register; and updating a second register responsive to the retirement of a second instruction, wherein said second register corresponds to said architected register and wherein said second instruction forms an end of said microcode routine.

13. The method as recited in claim 12, wherein said microcode routine comprises a plurality of instructions including said first instruction and said second instruction.

14. The method as recited in claim 12, wherein a reorder buffer is configured to copy contents of said second register to said first register responsive to handling of fault by a microcode fault handler.

15. The method as recited in claim 12, wherein said architected register is a stack pointer register.

16. The method as recited in claim 15, wherein said stack pointer register is configured to store a value which points to a stack.

* * * * *